United States Patent [19]

Lundberg et al.

[11] 4,330,447
[45] May 18, 1982

[54] THERMOPLASTIC ELASTOMERIC COMPOSITIONS HAVING IMPROVED FLOW

[75] Inventors: Robert D. Lundberg, Bridgewater; Robert R. Phillips, Spring Lake Heights; Ilan Duvdevani, Leonia, all of N.J.

[73] Assignee: Exxon Research & Engineering Co., Florham Park, N.J.

[21] Appl. No.: 222,484

[22] Filed: Jan. 5, 1981

[51] Int. Cl.³ .............................................. C08L 91/00
[52] U.S. Cl. ..................................... 524/269; 525/105; 524/399; 524/400; 524/572; 524/576
[58] Field of Search ............................... 525/106, 105; 260/23.5 A, 23.7 B, 28.5 A, 28.5 B, 31.2 MR

[56] References Cited

U.S. PATENT DOCUMENTS

| | | | |
|---|---|---|---|
| 3,121,069 | 2/1964 | Dietz | 525/106 |
| 4,208,310 | 6/1980 | Lundberg et al. | 260/23.5 A |
| 4,234,702 | 11/1980 | Nakamura | 525/105 |

Primary Examiner—Joseph L. Schofer
Assistant Examiner—N. Sarofim
Attorney, Agent, or Firm—Richard E. Nanfeldt

[57] ABSTRACT

This invention relates to a blend composition of a metal neutralized sulfonated polymer, a preferential plasticizer and polydialkylsiloxane, wherein the blend composition has improved melt flow and a lower coefficient of friction while substantially maintaining physical properties as compared to the blend of either the metal neutralized sulfonated polymer and preferential plasticizer or the metal neutralized sulfonated polymer itself.

13 Claims, No Drawings

THERMOPLASTIC ELASTOMERIC COMPOSITIONS HAVING IMPROVED FLOW

FIELD OF THE INVENTION

This invention relates to a blend composition of a metal neutralized sulfonated polymer, a preferential plasticizer and polydialkylsiloxane, wherein the blend composition has improved melt flow and a lower coefficient of friction while substantially maintaining physical properties as compared to the blend of either the metal neutralized sulfonated polymer and preferential plasticizer or the metal neutralized sulfonated polymer itself.

BACKGROUND OF THE INVENTION

The use of metal neutralized sulfonated polymers such as zinc sulfonated EPDM terpolymer as thermoplastic elastomers has been described in many U.S. Patents such as Nos. 3,974,240; 3,974,241; 3,642,728; 3,836,511; 3,870,841; and 3,847,854, which are all herein incorporated by reference. While these and related compositions exhibit good physical properties, their melt flow at elevated temperatures has been generally defensive. Attempts at improvements in the flow characteristics of these compositions have generally resulted in an adverse effect on physical properties. In general, a proper balance of physical and rheological properties necessary for an extrudable or injection moldable composition has been unattainable although these compositions have been readily adaptable for compression molding processes. For example, in U.S. Pat. Nos. 3,974,240 and 3,974,241, the method of improving the flow characteristics of the blend compositions was the incorporation of a polyolefinic thermoplastic into the blend composition resulting in improvement of the flow characteristic; however, the polyolefinic thermoplastic had an adverse effect on the physical elastomeric properties of the blend composition by increasing its hardness.

The method as described in the instant invention of improving the flow characteristics of a metal neutralized sulfonated polymer by the incorporation of a silicone rubber such as polydimethylsiloxane results in a blend composition that has a proper balance of physical and rheological properties thereby enabling the user to readily extrude or injection mold the composition into a high performance elastomeric article.

The incorporation of the polydimethylsiloxane in the blend compositions permits the user to decrease the concentration levels of the preferential plasticizer which has an adverse effect on the physical properties of the composition while maintaining suitable rheological properties for an injection molding or extrusion process.

SUMMARY OF THE INVENTION

This invention relates to a blend composition of a metal neutralized sulfonated polymer, a preferential plasticizer and polydialkylsiloxane such as polydimethylsiloxane, wherein the blend composition has improved melt flow and a lower coefficient of friction while substantially maintaining physical properties as compared to the blend of either the metal neutralized sulfonated polymer and preferential plasticizer or the metal neutralized sulfonated polymer itself.

The blend composition of the metal neutralized sulfonated polymer, preferential plasticizer and the polydimethylsiloxane can be readily blended with fillers, non-polar process oils and waxes and mixtures thereof in order to further modify both the physical and rheological properties of the blend composition.

GENERAL DESCRIPTION OF THE INVENTION

This present invention relates to unique and novel blend compositions of a metal neutralized sulfonated polymer, preferential plasticizer and polydimethylsiloxane, wherein optionally a filler, a non-polar process oil or a wax and mixtures thereof can be incorporated into the blend compositions. The resultant blend compositions have viscosities at 0.73 $sec^{-1}$ at 200° C. of less than about $5.0 \times 10^6$ poise, more preferably about $5 \times 10^3$ to about $5 \times 10^6$ poises, wherein the blend compositions are readily processable in a conventional extrusion or injection molding process into a high performance elastomeric article such as a garden hose or a sneaker sole. The resultant elastomeric article has excellent low and elevated temperature flexibility, excellent flex fatigue, superior dimensional stability, good resilience, and a rubber-like feel, and a Shore A Hardness of about 40 to about 90.

Additionally, a reinforcing filler such as a silica or carbon black can be incorporated into the blend composition, wherein the reinforcing filler constitutes a minor portion of the blend composition.

The neutralized sulfonated elastomeric polymers of this present instant invention are derived from unsaturated polymers which include low unsaturated elastomeric polymers such as Butyl Rubber, or EPDM terpolymers.

Alternatively, other unsaturated polymers are selected from the group consisting essentially of partially hydrogenated polyisoprenes, partially hydrogenated polybutadienes, Neoprene, styrene-butadiene copolymers or isoprene-styrene random copolymers.

The expression "Butyl Rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl Rubber generally has a Staudinger molecular weight of about 20,000 to about 500,000, preferably about 25,000 to about 400,000 especially about 100,000 to about 400,000 and a Wijs Iodine No. of about 0.5 to 50, preferably 1 to 15. The preparation of Butyl Rubber is described in U.S. Pat. No. 2,356,128 which is incorporated herein by reference.

For the purposes of this invention, the Butyl Rubber may have incorporated therein from about 0.2 to 10% of combined multiolefin; preferably about 0.5 to about 6%; more preferably, about 1 to about 4%, e.g. 2%.

Illustrative of such a Butyl Rubber is Exxon Butyl 365 (Exxon Chemical Co.), having a mole percent unsaturation of about 2.0% and a Mooney viscosity (ML, 1+8, 212° F.) of about 40–50.

Low molecular weight Butyl Rubbers, i.e. Butyl Rubbers having a viscosity average molecular weight as measured by GPC of about 5,000 to 85,000 and a mole percent unsaturation of about 1 to about 5% may be sulfonated to produce the polymers useful in this invention. Preferably, these polymers have a viscosity average molecular weight as measured by GPC of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 wt. % ethylene and about 1 to about 10 wt. % of a diene monomer, the balance of the polymer being propylene. Preferably, the polymer contains about 45 to about 80 wt. % ethylene, e.g. 50 wt. % and about 2.6 to about 8.0 wt. % diene monomer, e.g. 5.0 wt. %. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}n$ as measured by GPC of Vistalon 2504 is about 47,000, the $\overline{M}v$ as measured by GPC is about 145,000 and the $\overline{M}w$ as measured by GPC is about 174,000.

Another EPDM terpolymer Vistalon 2504-20 is derived from Vistalon 2504 (Exxon Chemical Co.) by a controlled extrusion process, wherein the resultant Mooney viscosity at 212° F. is about 20. The $\overline{M}n$ as measured by GPC of Vistalon 2504-20 is about 26,000, the $\overline{M}v$ as measured by GPC is about 90,000 and the $\overline{M}w$ as measured by GPC is about 125,000.

Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$) as measured by GPC of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to 40. The $\overline{M}v$ as measured by GPC of the EPDM terpolymer is preferably below about 500,000 and more preferably below about 350,000.

In carrying out the invention, the elastomeric polymer is dissolved in a non-reactive solvent such as a chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene or triethyl phosphate. The most preferred sulfonation agent for this invention is an acyl sulfate selected from the group consisting essentially of benzoyl acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol or isopropanol, with an aromatic hydroxyl compound, such as phenol, a cycloaliphatic alcohol such as cyclohexanol or with water. The unneutralized sulfonated elastomeric polymer has about 10 to about 100 meq sulfonate groups per 100 grams of sulfonated polymer, more preferably about 15 to about 50; and most preferably about 20 to about 40. The meq of sulfonate groups/100 grams of polymer is determined by both titration of the polymeric sulfonic acid and Dietert Sulfur analysis. In the titration of the sulfonic, the polymer is dissolved in solvent consisting of 95 parts to toluene and 5 parts of methanol at a concentration level of 50 grams per liter of solvent. The sulfonate is titrated with ethanolic sodium hydroxide to an Alizarin-Thymolphthalein endpoint.

The unneutralized sulfonated polymer is gel free and hydrolytically stable. Gel is measured by stirring a given weight of polymer in a solvent comprised of 95 toluene-5-methanol at a concentration of 5 wt. %, for 24 hours, allowing the mixture to settle, withdrawing a weighed sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

Neutralization of the unneutralized sulfonated elastomeric polymer is done by the addition of a solution of a basic salt to the unneutralized sulfonated elastomeric polymer dissolved in the mixture of the aliphatic alcohol and non-reactive solvent. The basic salt is dissolved in a binary solvent system consisting of water and/or an aliphatic alcohol. The counterion of the basic salt is selected from the group consisting of ammonium, antimony, iron, aluminum, lead, or Groups I-A, II-A, I-B or II-B of the Periodic Table of Elements and mixtures thereof. The anion of the basic salt is selected from the group consisting of a carboxylic acid having from about 1 to about 4 carbon atoms, a hydroxide, or alkoxide and mixtures thereof. The preferred neutralizing agent is a metal acetate, more preferably zinc acetate. Sufficient metal salt of the carboxylic acid is added to the solution of the unneutralized sulfonated elastomeric polymer to effect neutralization. It is preferable to neutralize at least 95% of the sulfonate groups, more preferably about 98%, most preferably 100%.

Examples of metal oxides useful in preparing metal sulfonates are MgO, CaO, BaO, ZnO, Ag$_2$O, PbO$_2$ and Pb$_3$O$_4$. Useful examples of metal hydroxides are NaOH, KOH, LiOH, Mg(OH)$_2$ and Ba(OH)$_2$. The resultant neutralized sulfonated terpolymer has a viscosity at 0.73 sec$^{-1}$ at 200° C. of less than about $5 \times 10^7$ poises, more preferably of about $5 \times 10^5$ poises to about $5 \times 10^7$ poises and most preferably about $5 \times 10^5$ poises to about $1.0 \times 10^7$ poises.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known for the purposes of this invention the relationship will be assumed to be one of direct proportionality. Thus, in comparing two materials, the one with the higher melt viscosity will be associated with the higher apparent molecular weight.

The melt viscosity of the systems investigated were determined by the use of an Instron Capillary Rheometer. Generally, the melt viscosity measurements were made at a temperature of 200° C. and at various shear rates corresponding to crosshead speeds from 0.005 in/min to 20 in/min. The apparent viscosity at 200° C. and at a shear rate of 0.73 sec$^{-1}$ (0.005 in/min) is employed as a characterization parameter in this invention. A measure of the melt elasticity of a given system can also be obtained from these rheological measurements. A type of flow instability known as metal fracture is exhibited by many polymeric materials of high molecular weight. This phenomenon is shear sensitive and thus will generally exhibit itself at a given shear rate and temperature. The shear rate for the onset of melt fracture indicates the upper shear rate for processing a given material. This is used as a characterization parameter for compounds employed in extrusion processing.

The metal sulfonate containing polymers at the higher sulfonate levels possess extremely high melt viscosities and are thereby difficult to process. The addition of ionic group plasticizers markedly reduces melt viscosity and frequently enhances physical properties.

To the neutralized sulfonated elastomeric polymer is added, in either solution or to the crumb of the unneutralized sulfonated elastomeric polymer, a preferential plasticizer selected from the group consisting of carboxylic acids having about 5 to about 30 carbon atoms, more preferably about 8 to about 22 carbon atoms, and basic salts of these carboxylic acids wherein the metal ion of the basic salt is selected from the group consisting of aluminum, ammonium, lead and Groups I-A, II-A, I-B or II-B of the Periodic Table of Elements and mixture thereof. The carboxylic acids are selected from the group consisting of lauric, myristic, palmitic and stearic acids and mixtures thereof; e.g. zinc stearate, magnesium stearate, or zinc laurate. The preferred preferential plasticizer is zinc stearate.

The preferential plasticizer is incorporated into the neutralized sulfonated elastomeric polymer at about 1 to about 15 parts by weight based on 100 parts by weight of the sulfonated polymer more preferably at about 2 to about 13, and most preferably at about 3 to about 11. The metallic salt of the carboxylic acid having about 5 to about 30 carbon atoms can also be used as neutralizing agent. In the case of the neutralizing agent and plasticizer being the identical chemical species, additional metallic salt is added over the required levels of neutralization. The resultant neutralized sulfonated elastomeric polymer with preferential plasticizer is isolated from the solution by conventional steam stripping and filtration.

The resultant neutralized and plasticized sulfonated elastomer has a viscosity at 200° C. and a shear rate of 0.73 sec$^{-1}$ of less than about $5 \times 10^6$ poise, more preferably less than about $3 \times 10^6$ poise and most preferably less than about $1.0 \times 10^6$ poise.

In order to further modify the flow properties of the blend of the metal neutralized sulfonated polymer and the preferential plasticizer, the polydimethylsiloxane is incorporated at a concentration level of about 0.1 to about 30 parts by weight per 100 parts by weight of the metal neutralized sulfonated polymer, more preferably about 1 to about 25, and most preferably about 2 to about 20. The incorporation of the polydimethylsiloxane improves the flow characteristics of the blend composition thereby enabling the user to minimize the concentration level of the preferential plasticizer so as to maximize the physical properties of the blend composition. The polydimethylsiloxane can be incorporated into the blend of the metal neutralized sulfonated elastomer by either addition of the polydimethylsiloxane to the cement of the metal neutralized sulfonated polymer either prior to or subsequent to the addition of the preferential plasticizer, or, alternatively, the polydimethylsiloxane can be compounded into the crumb of the blend of the metal neutralized sulfonated elastomeric polymer by techniques well known in the art. For example, the blend composition can be compounded on a two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer.

The blend of the metal neutralized sulfonated elastomeric polymer, preferential plasticizer and polydimethylsiloxane can be compounded with a filler or a wax, and a non-polar process oil and mixtures thereof by the previously described method for compounding the polydimethylsiloxane, wherein the filler, non-polar process oil and wax and mixtures thereof can be compounded with the blend composition prior to, simultaneously with or subsequent to the addition of the polydimethylsiloxane. Alternatively, the non-polar process oil can be added directly to the cement of the metal neutralized sulfonated elastomeric polymer.

The fillers employed in the present invention are selected from talcs, ground calcium carbonate, water precipitated calcium carbonate, silicas, or delaminated, calcined or hydrated clays and mixtures thereof. These fillers are incorporated into the blend composition at up to about 350 parts by weight per 100 parts by weight of the neutralized sulfonated elastomeric polymer, more preferably at up to about 300; and most preferably at about 5 to about 300. Typically, these fillers have a particle size of about 0.01 to about 20 micrometers, more preferably about 0.1 to about 10, and most preferably about 0.2 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE-I

| Filler | Code # | Oil Absorption grams of oil/ 100 grams of filler | Specific gravity | Avg. Particle Size Micrometers | pH |
| --- | --- | --- | --- | --- | --- |
| calcium carbonate, ground | Atomite | 15 | 2.71 | 0.5–10 | 9.3 |
| calcium carbonate, precipitated | Purecal U | 35 | 2.65 | .03–.04 | 9.3 |
| calcium carbonate, precipitated | Dix-Glos-U | 50 | 2.65 | 0.05–0.1 | 11–12 |
| delaminated clay | Polyfil DL | 30 | 2.61 | 4.5 | 6.5–7.5 |
| hydrated clay | Suprex | | 2.6 | 2 | 4.0 |
| calcined clay | Icecap K | 50–55 | 2.63 | 1 | 5.0–6.0 |
| magnesium silicate | Mistron Vapor | 60–70 | 2.75 | 2 | 9.0–7.5 |
| amorphous silica | I msil A-108 | 30 | 2.65 | 1.1 | 6.8–7.2 |
| amorphous silica | I msil A-10 | 30 | 2.65 | 1.55 | 6.8–7.2 |
| silica, hydrated | Hi Sil 233 | | 1.95 | 0.02 | 7.3 |
| silica, fumed | Cab-O-Sil | | 2.14 | 0.015–0.020 | 4.5–6.0 |

The oils employed in the present invention are nonpolar process oils having less than about 2.0 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 s.s.u.'s at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of up to about 250 parts by weight per 100 parts by weight of the metal neutralized sulfonated elastomeric polymer; more preferably at up to about 200, and most preferably about 5 to about 150.

TABLE II

| Type Oil | Oil Code # | Viscosity ssu | Mn | % Polars | % Aromatic | % Saturates |
| --- | --- | --- | --- | --- | --- | --- |
| Paraffinic | Sunpar 115 | 115 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |
| Paraffinic | Tufflo 6056 | 495 | — | 0.0 | 0.9 | 99.1 |
| Naphthenic | Tufflo 6054 | 580 | — | 0.0 | 8.0 | 92.0 |

A lubricant can be employed in the blend composition at a concentration level of up to about 40 parts by weight per 100 parts by weight of the neutralized sulfonated elastomeric polymers, and more preferably up to about 30. The lubricants of the present instant invention are non-polar paraffinic hydrocarbon waxes having a softening point of about 135° F. to about 220° F., more preferably 150° F. to 200° F., wherein the wax has a number average molecular weight as measured by GPC of about 200 to about 4000, more preferably 500 to 3500, and less than about 2 wt. % polar constituents. These lubricants modify the rheological properties of the composition, improve the processability in forming the elastomeric article and impart a shine or gloss of the elastomeric article. Additionally, amorphous polypropylene can be used as a lubricant.

Additionally, reinforcing fillers can be added as additives to the blends of metal neutralized sulfonated elastomeric polymer, preferential plasticizer, polydimethylsiloxane, filler and oil, wherein the reinforcing filler is selected from the group consisting of silica, mineral black, carbon black, and calcium silicate and mixtures therein. These reinforcing agents are generally characterized as having particle sizes below 0.1 micrometers and oil absorption above about 100 and are incorporated in the blend composition at up to 150 parts by weight per 100 parts by weight of metal neutralized sulfonated elastomeric polymer, more preferably 1 to 125.

The ingredients incorporated into the blend compositions of the present invention, in conjunction with the type of elastomeric polymer, the degree of sulfonation, the concentration of polydimethylsiloxane, and the metal counterion of the neutralized sulfonated elastomeric polymer and the type and concentration of preferential plasticizer give materials processable by extrusion or injection molding processes into elastomeric articles having the excellent physical and rheological properties.

DETAILED DESCRIPTION

The advantages of both the rheological and physical properties of the blend compositions of the present invention can be more readily appreciated by reference to the following examples, figures and tables. Unless otherwise specified, all measurements are in parts per hundred by weight.

EXAMPLE 1

Zinc neutralized sulfonated EPDM terpolymers were prepared according to the procedures of U.S. Pat. No. 3,836,511, wherein the sulfonate groups were neutralized with zinc acetate. The three resultant zinc neutralized EPDM terpolymers are labeled Thionic TP 303, Thionic TP 308 and Thionic TP 320. Sulfonated Thionic TP 303 and 308 each have 30 meq. of zinc sulfonate groups, are formed from a 20 Mooney viscosity at 212° F. EPDM terpolymers which has 56% ethylene in the backbone, wherein Thionic 308 has 30 meq. of zinc stearate added after neutralization in the reactor. Sulfonated Thionic 320 has 25 meq. of zinc sulfonate groups and are formed from a 40 Mooney viscosity at 212° F. EPDM terpolymer which has 50% ethylene in the backbone.

EXAMPLE 2

A sample of polydimethylsiloxane (PDMS) has a specific gravity of 0.98, glass transition of −123° C., melting point of −34° C., solubility parameter of about 7.4 and a viscosity of 60,000 centipoise. The PDMS was compounded with the metal neutralized sulfonated EPDM terpolymer TP 303 of Example 1.

Ten parts of the powdered metal neutralized sulfonated EPDM terpolymer was placed on a hot two-roll mill at a temperature of 160° C. and 1.4 parts of PDMS was added. The sulfonated EPDM did not band or flux at temperatures up to 190° C. At that point, one part of zinc stearate was added to the blend and the entire mass fluxed. The material was sticky on the mill and the temperature was decreased. At 130° C. the product was removed from the mill as a sheet, which when cooled, was tough, translucent, and very slick to the feel. One week later, the product was compression molded at 250° F. The resultant pads were elastomeric, very slippery (low coefficient of friction). Qualitatively, pads prepared with sulfonated EPDM alone possessed a surface which was not slippery.

The melt flow of this blended product was measured at 190° C. at a pressure of 250 psi. The extrudate emerged rapidly and was observed to have an M.I. of 9.8 g/10 min. The extrudate appeared smooth, with some die swell. In the absence of the PDMS, this sample of sulfonated EPDM would be expected to have an M.I. of 1 to 2.

The stress strain properties were measured at room temperature and are shown in Table III.

TABLE III

Stress Strain Behavior of Sulfonated EPDM-PDMS Blends

| % Strain | 100 | 200 | 300 | 400 | 500 | At Break (580%) |
|---|---|---|---|---|---|---|
| Stress, psi | 243 | 402 | 593 | 1010 | 1541 | 2503 |

Based on the flow data and the physical properties, it is apparent that PDMS has markedly improved the flow without sacrifice of the physical properties. In addition, it is seen that there is a marked change in the surface properties of the blends as compared to the metal neutralized sulfonated EPDM terpolymer without polydimethylsiloxane. The milled sheet and compression molded pads display a very low coefficient of friction, yet display no evidence of exudation or other surface blemish. This characteristic could be an extremely valuable one for such polymers.

EXAMPLE 3

Samples of zinc neutralized sulfonated EPDM terpolymer, 30 meq. sulfonate level (TP-303) and zinc neutralized sulfonated EPDM terpolymer, 30 meq. sulfonate level, Zn stearate plasticized (TP-308) of Example 1 were treated as follows:

Hexane treated-75 g of each zinc neutralized sulfonated EPDM terpolymer was stirred ½ hour in 1500 ml. hexane.

10% polydimethylsiloxane/hexane treated-67.5 g of each zinc neutralized sulfonated EPDM terpolymer was stirred ½ hour in a solution of 7.5 g polydimethylsiloxane/1500 ml. hexane.

5% polydimethylsiloxane/hexane treated-71.25 g of each zinc neutralized sulfonated EPDM terpolymer was stirred ½ hour in a solution of 3.75 g polydimethylsiloxane/1500 ml. hexane.

Each of the above slurries was then evaporated to dryness in a hood.

A sample of TP-308 was charged to a two-roll electrically heated mill at 130 C. Temperature was increased until at 170° C., fusion was obtained producing an almost clear milled sample. A sample of TP-308+10% polydimethylsiloxane obtained from the evaporated hexane slurry above, was charged to the mill at 170° C. Mill temperature was gradually increased to 190° C., at which temperature fusion was obtained producing an opaque, cream colored milled sample.

Sample pads were pressed of zinc neutralized sulfonated EPDM (TP-308) untreated (3-B), hexane treated (3-B-1), hexane-10% PDMS (3-B-2) and hexane-5% PDMS (3-B-3) slurry blends at 350° F.; zinc neutralized sulfonated EPDM (TP-303) untreated (3-A) hexane treated (3-A-1), hexane-10% PDMS (3-A-2) and hexane-5% PDMS (3-A-3) slurry blends at 400° F. An additional double pressed sample was prepared of each at the same temperatures. Sample pads of the milled TP-308 (3-B, milled) and 10% PDMS-TP-308 (3-B-2, milled) were also pressed at 350° F.

Melt index (190° C., 250 psi), compression set (room temperature and 70° C.) and stress-strain (room temperature) properties were obtained on each sample (Table IV).

TABLE IV

Physical Property Evaluation
Sulfo EPDM + Polydimethylsiloxane
Example 2

| Sample | Sulfo EPDM | % PDMS | Sample Treatment | M.I. g/10 min. | Compress Set, 30 min. R.T. | Compress Set, 30 min. 70° C. | Stress-Strain, psi at % Elongation 100 | 200 | 300 | 400 | 500 | Tensile | Elong., % |
|---|---|---|---|---|---|---|---|---|---|---|---|---|---|
| 3-A | TP-303 | 0 | — | No Flow | 14 | 65 | 320 | 520 | 845 | 1430 | — | 2395 | 475 |
| " | " | " | Double Press | — | — | — | 345 | 580 | 925 | 2480 | — | 2480 | 400 |
| 3-A-1 | " | 0 | Hexane | — | 17 | 70 | 305 | 495 | 825 | 1330 | — | 2605 | 500 |
| " | " | " | Double Press | — | — | — | 325 | 645 | 1100 | — | — | 1290 | 320 |
| 3-A-2 | " | 10 | Hexane | 0.0039 | 20 | 73 | 240 | — | — | — | — | 270 | 115 |
| " | " | " | Double Press | — | — | — | 315 | 560 | 925 | — | — | 1065 | 330 |
| 3-A-3 | " | 5 | Hexane | — | 19 | 73 | 285 | — | — | — | — | 450 | 195 |
| " | " | " | Double Press | — | — | — | 375 | 765 | — | — | — | 1205 | 280 |
| 3-B | TP-308 | 0 | — | 0.025 | 37 | 81 | 360 | 540 | 910 | 1790 | 4530 | 5630 | 515 |
| " | " | " | Double Press | — | — | — | 400 | 610 | 960 | 1875 | 5085 | 5440 | 505 |
| 3-B-1 | " | 0 | Hexane | 0.038 | 37 | 84 | 365 | 535 | 900 | 1775 | — | 4330 | 480 |
| " | " | " | Double Press | — | — | — | 350 | 545 | 870 | 1570 | 4620 | 4545 | 505 |
| 3-B-2 | " | 10 | Hexane | 0.19 | 40 | 83 | 280 | 460 | — | — | — | 570 | 235 |

TABLE IV-continued

Physical Property Evaluation
Sulfo EPDM + Polydimethylsiloxane
Example 2

| Sample | Sulfo EPDM | % PDMS | Sample Treatment | M.I. g/10 min. | Compress Set, 30 min. R.T. | Compress Set, 30 min. 70° C. | Stress-Strain, psi at % Elongation 100 | 200 | 300 | 400 | 500 | Tensile | Elong., % |
|---|---|---|---|---|---|---|---|---|---|---|---|---|---|
| " | " | " | Double Press | — | — | — | 385 | 585 | 940 | 1835 | — | 2300 | 440 |
| 3-B-3 | " | 5 | Hexane | 0.075 | 39 | 80 | 370 | 595 | 1100 | — | — | 1290 | 350 |
| " | " | " | Double Press | — | — | — | 385 | 605 | 1010 | — | — | 1425 | 360 |
| 3-B milled | TP-308 | 0 | Milled | 0.039 | 37 | 82 | 370 | 560 | 960 | 1835 | 4620 | 5790 | 520 |
| 3-B-2 | " | 10 | Milled | 0.087 | 33 | 88 | 360 | 635 | 1060 | 1960 | — | 3860 | 470 |

A modest increase in melt index is achieved with the incorporation of polydimethylsiloxane with little effect on compression set properties. Poor dispersion in pads obtained from the dried hexane slurry samples resulted in short elongations. Milling produced a PDMS-sulfonated EPDM blend with a comparable stress-strain profile to the untreated sulfonated EPDM with a 10% decrease in elongation.

The milled sheet and pressed pad samples of 10% PDMS-sulfonated EPDM exhibited a pronounced slippery feel not evident in the untreated sulfonated EPDM.

EXAMPLE 4

Extrudable thermoplastic compounds were prepared from a sulfonated EPDM terpolymer of example 1 containing 25 meq. of zinc sulfonate moiety. The compounds which are shown in Table V included 0, 5 and 15 parts of the polydimethylsiloxane of Example 2 per 100 parts of zinc sulfonated EPDM. The compounding was done in a laboratory size Banbury intensive mixer. All the ingredients less the polydimethylsiloxane were added to the mixer and compounded for 4-6 minutes, until the material reached a temperature of 160°-190° C. Then, the PDMS was added in two steps; half was added first and the second half was added 1-2 minutes later and the mixing was finished 1-2 minutes after the last addition.

Samples for physical property measurements shown in Table 6 were prepared by injection molding using a 220° C. melt temperature. The injection molded samples of compounds 5-3, containing 15 phr of PDMS exhibited a pronounced slippery feel, not noticeable in the other two compounds, 5-1 and 5-2.

Increased spiral flow and melt flow rate were observed with the incorporation of polydimethylsiloxane in the formulations with little sacrifice in stress-strain and compression set properties.

TABLE V

| Sample | Compound Formulation 5-1 | 5-2 | 5-3 |
|---|---|---|---|
| Ingredients, phr | | | |
| Sulfonated EPDM TP-320 | 100 | 100 | 100 |
| Zinc Stearate | 10 | 10 | 10 |
| Oil, Sunpar 2280 | 86 | 86 | 86 |
| Dix Glos U (Manf. Dixie Lime and Stone Co., Tampa, FL) | 91 | 91 | 91 |
| Ice Cap K Clay | 66 | 66 | 66 |
| LD-600, LDPE (Exxon) | 22 | 22 | 22 |
| ZnO (Protox 166) | 7 | 7 | 7 |
| Irganox 1010 (Antioxidant) | 0.5 | 0.5 | 0.5 |
| Polydimethylsiloxane | 0 | 5 | 15 |

TABLE VI

| Sample | Compound Properties 1 | 2 | 3 |
|---|---|---|---|
| Hardness "Shore A" | 68 | 67 | 64 |
| Spiral Flow, cm | 7.7 | 8.7 | 10.1 |
| Compression Set, % | | | |
| 22 hrs./R.T. | 16 | 19 | 21 |
| 22 hrs./70° C. | 68 | 75 | 74 |
| R. T. Tensiles | | | |
| 100% Modulus, psi | 663 | 607 | 521 |
| Tensile, psi | 746 | 648 | 527 |
| Elongation, % | 130 | 121 | 122 |
| Tensile Set, % | 4.3 | 2.4 | 0.4 |
| 80° C. Tensiles | | | |
| 100% Modulus, psi | — | 270 | 243 |
| Tensile, psi | 287 | 275 | 246 |
| Elongation, % | 86 | 112 | 112 |
| MFR at 190° C., 43 psi | 0.06 | 0.09 | 0.21 |
| MFR at 190° C., 250 psi | 8.90 | 12.0 | 12.53 |

Since many modifications and variations of this invention may be made without departing from the spirit or scope of the invention thereof, it is not intended to limit the spirit or scope thereof to the specific examples thereof.

What is claimed is:

1. A thermoplastic elastomeric composition having improved flow comprising:
   (a) a neutralized sulfonated polymer; derived from an elastomeric polymer selected from the group consisting of EPDM terpolymers and Butyl Rubber;
   (b) about 1 to about 15 parts by weight of preferential plasticizer selected from the group consisting of carboxylic acids having about 5 to about 30 carbon atoms and metallic salts of said carboxylic acids;
   (c) about 0.1 to about 30 parts by weight of polydimethylsiloxane per 100 parts by weight of the neutralized sulfonated polymer.

2. A polymeric composition according to claim 1, wherein a metal atom of said metallic salt of such carboxylic acid having about 5 to about 30 carbon atoms is selected from the group consisting of iron, aluminum, antimony, and Groups I-A, II-A, I-B, and II-B of the Periodic Table of Elements.

3. A polymeric composition according to claim 1, wherein said neutralized sulfonated polymer has about 10 to about 100 meq. of neutralized sulfonate groups/100 grams of said neutralized sulfonate polymer, said neutralized sulfonate groups have a counterion selected from the group consisting of ammonium, iron, aluminum, antimony and Groups I-A, II-A, I-B and II-B of the Periodic Table of Elements.

4. An elastomeric composition according to claim 1, wherein said neutralized elastomeric polymer is derived from an EPDM terpolymer having a Mooney viscosity (ML 1+8, 212° F.) of about 5 to about 60.

5. A polymeric composition according to claims 1 or 4, wherein said preferential plasticizer is zinc stearate.

6. A polymeric composition according to claim 1, further including up to about 350 parts by weight of a filler per 100 parts by weight of said neutralized sulfonated polymer, wherein said filler is selected from the group consisting of talcs, clays and calcium carbonates and mixtures thereof.

7. A polymeric composition according to claim 5, further including up to about 350 parts by weight of a filler per 100 parts by weight of said neutralized sulfonate polymer, wherein said filler is selected from the group consisting of talcs, clays and calcium carbonates and mixtures thereof.

8. A polymeric composition according to claim 1, further including up to about 250 parts by weight of a non-polar process oil having less than 2.0 wt. % polar type compounds per 100 parts by weight of the neutralized sulfonated polymer.

9. A polymeric composition according to claim 6, further including up to about 250 parts by weight of a non-polar process oil having less than 2.0 wt. % polar type compounds per 100 parts by weight of the neutralized sulfonated polymer.

10. A polymeric composition according to claim 7, further including up to about 250 parts by weight of a non-polar process oil having less than 2.0 wt. % polar type compounds per 100 parts by weight of the neutralized sulfonated polymer.

11. A polymeric composition according to claim 9, further including up to about 150 parts by weight of a reinforcing filler per 100 parts by weight of the neutralized sulfonated polymer.

12. A polymeric composition according to claims 1 or 6, further including up to about 30 parts by weight of a wax per 100 parts by weight of neutralized sulfonated polymer.

13. A composition according to claims 1, 6 or 7, wherein the sulfonate groups of the neutralized sulfonated polymer are neutralized with a zinc counterion and said neutralized sulfonated polymer is derived from an EPDM terpolymer having a Mooney viscosity (ML 1+8, 212° F.) of about 5 to about 60.

* * * * *